United States Patent Office 3,258,345
Patented June 28, 1966

3,258,345
EXTENDING SHELF LIFE OF CURED MEATS
Warren R. Schack, Western Springs, and Robert Edward Taylor, Glenview, Ill., assignors, by mesne assignments, to Robert H. Harper, Fort Atkinson, Wis.
No Drawing. Filed Nov. 8, 1961, Ser. No. 150,893
6 Claims. (Cl. 99—159)

This invention relates in general to the preparation of canned product containing cured heme pigments. More specifically, our invention is directed to a method for extending the shelf life of shelf-stable canned product containing cured meat while reducing the heat process "sterilization value" used and to the product produced thereby.

Conventionally, nitrates have been usde to develop the red color associated with cured meats. More recently nitrites, usually with nitrates, have been employed as curing salts.

It is generally believed that the natural reducing capacity of the meat, along with the end products of the metabolism of the bacteria found in meat, bring about a production of nitric oxide in situ from the curing salts. The nitric oxide and/or some combination of nitric oxide and hydrogen ions under normal curing conditions reacts with the reduced unoxygenated pigments of hemoglobin, myoglobin, and cytochrome (the three of which can be collectively referred to as "heme pigments") to give the uncooked, cured pigments nitric oxide hemoglobin, nitric oxide myoglobin, and nitric oxide cytochrome. The term "cured" (or "cure") as used herein refers to products (or the processes) in which these nitric oxide pigments have been produced.

The manufacturers of canned food products are constantly faced with the problem of producing a product in which microorganisms do not cause spoilage (both as actual deterioration of product and/or undesirable flavor, odor, and appearance of the product) and/or potential health hazard. A canned product in which these microorganisms will not grow though exposed for extended times to temperatures over 40° F. under conditions which normally exist in any store or warehouse is termed a shelf-stable product.

The shelf life of the product is said to be increased or extended whenever it is possible to lengthen the time after canning before product spoilage occurs.

One of the more conventional methods of eliminating bacteria, molds, and yeasts from food is by way of thermal destruction of the microorganisms. For example, in canning foods the product is placed in a container, sealed, and heated in hot or boiling water or exposed to steam under pressure for a predetermined period of time. Foods may be pasteurized or otherwise cooked and placed in packages or containers before or after the heat treatment. Molds, yeasts, vegetative cells (the heat-sensitive form of bacteria of the family Bacillaceae as distinguished from the heat-resistant spore form), and most nonsporing forms of bacteria are easily destroyed by low heat processing, e.g. pasteurizing temperatures. However, such low temperature processing is ineffective in inhibiting many spore-forming and heat-resistant bacteria. Thermal destruction of bacteria is also a function of a time-temperature relationship, destruction occurring in a shorter period at high temperatures than at low temperatures. Therefore, it is possible to heat-process foods to such a degree that substantially all the microorganisms are destroyed. However, the period required may be so long and/or the temperature so high that flavor and texture of the product, as well as the nutritive value of the product, often decreases markedly with a general loss of quality of the product. Any method by which processing temperature or heating time can be safely decreased is therefore desirable. In addition to possible quality loss by the heat treatment, it is possible, no matter how rigid the standards and controls of the manufacturer, for an occasional quantity of canned product to have not received sufficient thermal treatment to make it shelf-stable. Thus, any additional safeguards which can be used by the manufacturer to insure that his canned product is shelf-stable are extremely useful, as are means for extending the shelf-stability of a normally nonshelf-stable process (as for example by providing a system whereby undesirable organisms are reduced in number during storage, thereby delaying spoilage at least for a period of time and generally permanently).

It is an object of the present invention to provide a method of preparing a cured product so adapted for canning that the canned product will be substantially shelf-stable.

An additional object of our invention is to provide a method of preparing a canned and cured product which will be substantially shelf-stable yet which can be thermally processed at a temperature lower than that normally required for shelf stability.

Another object is the production of a cured product adaptable to canning with a less than normally required time-temperature system to provide a substantially shelf-stable canned product.

Further objects and advantages of the invention will be clear to those skilled in the art from the following description of the invention.

We have discovered that it is possible to produce a cured, heme-containing product having the novel characteristic of being adaptable to canning whereby to produce a substantially shelf-stable product, provided particular operations in a particular sequence are carried out on the meat prior to canning. Briefly, in carrying out the method of our invention we first thoroughly and substantially uniformly disperse ascorbic acid throughout the heme-containing product. Subsequently, a nitric oxide generating material is introduced under a positive pressure into the product containing the ascorbic acid while the product is at a positive pressure. By carrying out these steps in this sequence and under the conditions called for, reaction products between the ascorbic acid, nitric oxide generating material, and heme pigments, plus an excess of nitric oxide over what is required to "cure" the product, is formed and maintained in the product. Thereafter, the cured product can be placed in a container and heat-processed. It is possible, when these steps have been taken, for the heat processing to be less severe than would be necessary under conventional curing conditions, thus minimizing loss of product quality, yet the canned product will be substantially shelf-stable.

More specifically, in the preferred practice of our invention we grind meat to a desired size, preferably while the meat is maintained at a temperature of 26–40° F. It is not intended that a meat particle size limitation be implied in this step since the amount of comminuation may vary from finely chopped meat emulsions to relatively coarse ground meats, and assuming an efficient enough ingredient distributing system it would be possible to use nonground meat, the important factor being a system wherein ingredients can be thoroughly and substantially uniformly dispersed throughout the meat product.

Subsequent to preparing meat of a predetermined particle size we deaerate the comminuted meat-containing product. For the purposes of our invention it appears that the amount of deaeration can vary. However, for the most efficient curing and the best quality product it is preferred to remove substantially all the free oxygen from the product. This can be achieved by vacuumizing the product to the greatest extent possible. Flushing and refilling with nitrogen, hydrogen and the like lowers the amount of oxygen present. We have found that three or four vacuumizations followed by refilling with nitrogen, etc., are usually adequate to obtain a product substantially free from air with the size of meat pieces and the temperature of the meat being factors to consider in determining the optimum number of cycles. For example, since substantially anaerobic conditions prevail within muscle tissue, it requires a somewhat more drastic deaeration procedure for a finely chopped meat emulsion than for coarser ground product to produce the same degree of freedom from air.

Ascorbic acid is then thoroughly and substantially uniformly dispersed throughout the deaerated meat product. A suitable method for achieving the maximum distribution of ascorbic acid in the product comprises adding the acid under a positive pressure or under vacuum with mixing, preferably in a vacuum mixer. Mixing is continued until the distribution is substantially uniform, a period which will vary in time, but which in most meat mixers will generally be of about 3–5 minutes' duration. This may also be accomplished in a continuous operation such as in product supply lines which normally operate with the product under positive pressure.

Subsequent to dispersing ascorbic acid into the product more than sufficient of a nitric oxide generating material to react with the heme pigments present in the meat is thoroughly and substantially uniformly distributed in the ascorbic acid-containing product while both are under suitable positive pressure. Such distribution can conveniently involve introduction of the nitric oxide-generating material, followed by a period of mixing under positive pressure until substantially uniform distribution is obtained. It is important that the product be kept under this positive pressure during the distribution of the nitric oxide generating material if it is desired to obtain the desirable shelf-stable, canned product of our invention.

We have found that the sequence of the above steps is important to the obtention of a shelf-stable product in substantially every instance. Thus, we have found that concurrent distribution through a common entrance system of ascorbic acid and nitric oxide generating material into the product or introduction of the nitric oxide generating material, followed by addition of ascorbic acid, will not invariably produce a shelf-stable product upon canning. In certain instances, good results may be achieved, but there is no great amount of predictability that the product will be shelf-stable unless the two materials are distributed separately into the meat in accordance with this invention.

The product so prepared is then ready to be canned in the conventional manner. The positive pressure can be removed at this point but it is recommended that the total procedure including canning, be carried out rapidly to make the entire process substantially continuous and in order to minimize any loss of nitric oxide from the product. By carrying out our novel process it is therefore possible to greatly increase in a cured product the amount of nitric oxide available for use as an antibacterial agent.

In the method of our invention we have found the use of at least about ¼ ounce ascorbic acid per hundredweight of meat to be a practical minimum added amount with, about, ½–¾ ounce per hundredweight being preferred. Amounts in excess of ¾ ounce per hundredweight could be used, but we have not found sufficient increase in efficiency of the method to warrant the use of more than this quantity. The nitric oxide generating material we preferably use is an alkali metal nitrite such as sodium nitrite. This material should be added in an amount sufficient to product more nitric oxide than is required to cure the product. Inasmuch as a very minute amount will cause a cured color to develop, we normally employ a large excess of the nitrite. We have found that amounts as small as about ⅛ ounce nitrite per hundredweight of product is sufficient not only to cure the product but to produce a canned product which will be substantially shelf-stable. Amounts in excess of ⅛ ounce per hundredweight and up to about ¼ ounce per hundredweight are commercially practical. Preferably we add that amount of nitrite which will incorporate the maximum amount of nitric oxide in the product at the time of canning. This amount will be about ¼ ounce. We have found that lesser amounts than ⅛ ounce per hundredweight while sometimes operable to produce a substantially shelf-stable product will not do so with the degree of predictability generally required by a food manufacturer. To the extent that these lesser amounts incorporate more nitric oxide in the canned product than has heretofore been possible, there will occur a desirable increase in shelf-life. Amounts greater than 1 ounce can be used, but are not deemed necessary to provide the benefits of our method.

The positive pressure required in the process can range from about 1/100 to 100 p.s.i.g. We prefer to carry out the process under inert gas (e.g., nitrogen) pressures of between about 1/100 and 1 p.s.i.g.

The following examples are for the purpose of illustration only and are not to be construed as limiting the scope of the claimed invention.

*Example 1*

The advantages of the invention in the preparation of comminuted meat items are illustrated in this example. The example shows the effect of various nitrite and ascorbic acid treatments on shelf stability of products which are inoculated with bacteria and subsequently exposed only to pasteurization temperatures. The comminuted meat mixture was prepared from the following formula:

| Ingredient: | Weight, lbs. |
| --- | --- |
| Beef chucks | 75 |
| Regular pork trimmings | 54 |
| Pork picnics | 171 |
| Salt | 6 |
| Sugar | 3 |

The meat ingredients were ground through a ¼-inch plate and placed in an 800-lb. capacity vacuum mixer. The salt and sugar, along with 25 lbs. of powdered Dry Ice, were added and the entire mixture was agitated for 3 minutes during which time a vacuum of 27 inches was maintained. The deaerated mixture was then placed in a grinder and ground through a ⅛-inch plate. Thirty pound portions were taken from this mixture and samples prepared as follows.

A. 30 lbs. of the mixture was placed in a 75-lb. capacity mixer and blended for 2 minutes under vacuumization of 29 inches of vacuum. Ascorbic acid solution was added while the vacuum was maintained on the mixture. The ascorbic acid solution contained .21 ounce of ascorbic acid in 6 ounces of water, to which had been added 1½ million PA No. 3679 organisms. After mixing to distribute the ascorbic acid solution and organisms throughout the mass (1 minute mixing), the vacuum was released with nitrogen gas and the pressure in the mixer reached 770 mm. of Hg (approximately 1/10 p.s.i.g.). At this point an aqueous solution of sodium nitrite containing .035 ounce of nitrite in 7 ounces of water was added as the mixture was agitated. Agitation was continued for 2 minutes while the mixer was under the positive nitrogen pressure and then the vessel was evacuated for a vacuum-mix cycle at 27 inches mercury to condition the product to the desired density for canned luncheon meat emulsion.

B. A sample was prepared in the same manner set forth for sample A above except that 0.15 ounce of sodium nitrite was dissolved in the 7 ounces of added water.

C. A sample was prepared in the same manner as that set forth for sample A above except that 0.3 ounce of sodium nitrite was dissolved in the 7 ounces of added water.

D. A sample was prepared in the same manner as that set forth for sample A above except that 0.6 ounce of sodium nitrite was dissolved in the 7 ounces of added water.

E. A sample was prepared in the same manner as that set forth for sample A above except that no sodium nitrite was added.

F. This 30-lb. sample was prepared as in the manner of the preparation of sample A with the exception that the amount of nitrite employed was not varied, but the amount of ascorbic acid solution was varied. The amount of sodium nitrite was .052 ounce in 7 ounces of added water. In this sample, the ascorbic acid was omitted from the water solution containing PA 7639 organisms.

G. This sample was prepared in the manner employed in the preparation of sample F with the exception that .035 ounce of ascorbic acid was substituted for the amount used in the preparation of sample F.

H. This sample was prepared in the manner employed in the preparation of sample F with the exception that .07 ounce of ascorbic acid was substituted for the amount used in the preparation of sample F.

I. This sample was prepared in the manner employed in the preparation of sample F with the exception that .14 ounce of ascorbic acid was substituted for the amount used in the preparation of sample F.

J. This sample was prepared in the manner employed in the preparation of sample F using .21 ounce of ascorbic acid and .052 ounce of sodium nitrite.

Each of the samples was mixed under vacuum and each sample was filled into 202 x 202 cans and processed for 70 minutes at 155° F. Incubation of the samples at 99±1° F. provided the following results:

| Sample | Ounces of Nitrite per cwt. of Meat | Ounces of Ascorbic Acid per cwt. of Meat | Percent Spoilage (Putrid) | Time of Spoilage days |
|---|---|---|---|---|
| A | 1/8 | 3/4 | 6 | 11-34 |
| B | 1/2 | 3/4 | 4 | 18-22 |
| C | 1 | 3/4 | 0 | (¹) |
| D | 2 | 3/4 | 0 | (¹) |
| E | 0 | 3/4 | 100 | 2-4 |
| F | 3/16 | 0 | 100 | 2-8 |
| G | 3/16 | 1/8 | 18 | 12-64 |
| H | 3/16 | 1/4 | 26 | 5-68 |
| I | 3/16 | 1/2 | 20 | 26-85 |
| J | 3/16 | 3/4 | 30 | 37-90 |

¹ No spoilage at 340 days.

*Example II*

Another batch of 618 lbs. of a comminuted meat mixture such as that of Example I was prepared by grinding the meat materials through a 1/4-inch plate and mixing the salt, sugar, and Dry Ice in the meat mix, using vacuum mixing. After grinding through a 1/8-inch plate, the meat mix in a truck was vacuumized for 10 minutes under 29 inches of vacuum. The meat was placed in a hopper and pumped to a filler for 3-lb. rectangular cans. The ascorbic acid and sodium nitrite were added in the pipe line. The product flow rate was 109.5 lbs. per minute from the hopper with an internal pressure in the product line of 100 p.s.i.g. A metering device located immediately after the product pump introduced 1½ lbs. of a 2% aqueous ascorbic acid solution per minute into the product flow. A short mixing section of pipe followed this metering device and a second metering device was located at the end of this mixing section. 1½ lbs. of a 1% aqueous sodium nitrite solution was added per minute of flow. The production rate was 112.5 lbs. per minute. After the product passed the sodium nitrite metering device it was passed through a short mixing section and discharged into the containers. The 400 x 400 x 602 rectangular cans were sealed under 27 inches of vacuum and processed for 70 minutes at 170° F., followed by an additional 170 minutes at 210° F. The samples after incubation at 99° F. ±1° for 90 days showed no product spoilage.

*Example III*

The method is applied to primal meat cuts rather than comminuted meats in this example.

Two pickle formulations were prepared. Pickle No. 1 contained the following ingredients in the amounts noted:

Pounds per gallon
Water ------------------------------------- 8.0046
Sodium tripolyphosphate -------------------- 0.4840
Sodium isoascorbate ------------------------ 0.0540
Salt --------------------------------------- 1.4574
Inoculum ----------------------------------- (*)

*Sufficient PA 3679 organisms and enterococci organisms were employed to provide in the meat pumped 25 spores of PA 3679 per gram of meat and 1,000,000 enterococci organisms per gram of meat.

The pickle had a salometer value of 85°.

The second pump pickle contained the following ingredients in pounds per gallon of pickle:

Pounds per gallon
Water ------------------------------------- 8.2261
Sodium nitrite ----------------------------- 0.0250
Salt --------------------------------------- 1.7489

The pickle had a salometer value of 72°.

Skinned, fresh green hams were artery pumped to 110% of the weight of the green ham with the first pump pickle. The pumped hams were held in storage for 24 hours at 38–42° F. and then arterially pumped an additional 8% by weight with the second pickle. All hams were held for 1 hour, then skinned, split open, boned, defatted to a surface layer of 1/4 inch, trimmed to exactly 9 lbs., and place in Number 4 base 709 x 1011 x 404 enamelled cans. Two ounces of dry gelatin was sprinkled into each ham cavity and all the cans were vacuum-sealed at 20–25 inches gauge vacuum.

All samples were cooked in water at 180° F. under 15–20 lbs. pressure. Six of the canned hams were processed in accordance with a short cooking procedure of 225 minutes to insure a maximum center can temperature of 165° F. and a center can temperature above 150° F. for at least 102 minutes. Six of the canned hams were given a long cooking process wherein a maximum center can temperature of 168° F. was obtained and a center can temperature above 150° F. for 138 minutes. The longer cook involved heating for 260 minutes. After chilling of the cooked, canned hams the samples were incubated at 98° F. ±1° and the number of spoiled hams was observed.

| Processing Conditions | No. of Hams Incubated | No. of Hams Spoiled (Putrid) | Time of Spoilage, Days |
|---|---|---|---|
| Short cook | 6 | 1 | 11 |
| Long cook | 6 | 0 | 90 |

The same two pickles containing the same ingredients except that 0.5 ounce of ascorbic acid per gallon was substituted for the isoascorbate in pickle No. 1 were used in pumping hams in the manner illustrated in Example III. Substantially the same improved resistance to spoilage was noted in this case as was realized with the hams pumped with pickle containing the ascorbate.

Hams not treated in accordance with the method of this invention must be retorted for 5¾ hours at 210° F. to provide sterilization.

Hams treated in the same manner, but pumped with pickles containing both ascorbic acid and the nitrite in one pickle, exhibited considerable spoilage in more than 50% of the samples after incubation of only 2–10 days.

Hams were also pumped with the same two pickles using a perforation type injection (ANCO injection) rather than the conventional arterial type pumping, and the out-of-can yields were between 86 to 90% with no spoilage after incubation at 98° F. ±1° for in excess of 90 days.

It is apparent that the separate addition of the reducing substance (ascorbic acid) and the curing salts into the meat mixture insures that the meat is conditioned so as to be resistant to spoilage when canned. Also the use of a positive pressure in the introduction of the nitrite also insures greatley improved shelf stability of the product.

Obviously many modifications and variations in the invention hereinbefore set forth may be made without departing from the spirit and scope thereof, and therefore only such limitations should be imposed as are indicated in the appended claims.

We claim:

1. A method of preparing a cured product for canning which comprises: dispersing ascorbic acid throughout a heme-containing meat product; and thereafter while said product in contact with said ascorbic acid is substantially free from air introducing a nitric oxide generating curing salt into said product while said product is held under a positive pressure whereby reaction products between said ascorbic acid, nitric oxide generating curing salt and heme pigments and an excess of nitric oxide over that required to cure said product are formed and maintained in said product.

2. A method of preparing a cured product for canning which comprises: preparing a comminuted heme-containing meat product substantially free from air; substantially uniformly dispersing ascorbic acid throughout said product; and substantially uniformly dispersing a nitric oxide generating curing salt throughout said product while said product is held under a positive pressure of at least about 1/100 p.s.i.g. whereby reaction products between said ascorbic acid, nitric oxide generating curing salt and heme pigments and an excess of nitric oxide over that required to cure said product are formed and maintained in said product.

3. A method of preparing a cured product for canning which comprises: vacuumizing a comminuted meat product containing heme pigments to substantially remove the air therefrom; substantially uniformly dispersing throughout said product at least about ¼ ounce ascorbic acid per cwt. of product; and substantially uniformly dispersing throughout said product at least about ⅛ ounce sodium nitrite per cwt. of product while said product is held free from oxygen at a positive pressure of at least about 1/100 p.s.i.g. whereby reaction products between said ascorbic acid, nitric oxide generating curing salt and heme pigments and an excess of nitric oxide over that required to cure said product are formed and maintained in said product.

4. A method of preparing a canned and cured meat product containing heme pigments which will be substantially shelf-stable and possess a good texture and flavor which comprises: dispersing ascorbic acid throughout a meat product containing heme pigments; introducing a nitric oxide generating curing salt into said product while said product is under a positive pressure of an oxygen-free inert gas whereby reaction products between said ascorbic acid, nitric oxide generating curing salt and heme pigments and an excess of nitric oxide over that required to cure said product are formed and maintained in said product, and canning said product.

5. A method of preparing a canned and cured meat product containing heme pigments which will be substantially shelf-stable and possess a good texture and flavor which comprises: preparing a comminuted meat product containing heme pigments substantially free from air; substantially uniformly dispersing ascorbic acid throughout said product; substantially uniformly dispersing a nitric oxide generating curing salt throughout said product while said product is held substantially free of air under a positive pressure whereby reaction products between said ascorbic acid, nitric oxide generating curing salt and heme pigments and an excess of nitric oxide over that required to cure said product are formed and maintained in said product, canning said product and processing employing a time-temperature system lower than that normally required to produce a shelf-stable product.

6. A method for continuously preparing a canned and cured meat product containing heme pigments which will be substantially shelf-stable and possess a good texture and flavor which comprises: vacuumizing a meat-containing product to substantially remove the air therefrom; replacing the vacuum on said product with sufficient inert gas to maintain said product under a positive pressure of at least 1/100 p.s.i.g.; substantially uniformly dispersing throughout said product at least about ¼ ounce ascorbic acid per cwt. of product; substantially uniformly dispersing throughout said ascorbic acid containing product at least about ⅛ ounce alkali metal nitrite whereby reaction products between said ascorbic acid, nitric oxide generating curing salt and heme pigments and an excess of nitric oxide over that required to cure said product are formed and maintained in said product; releasing the pressure to atmospheric; and rapidly thereafter canning said product.

References Cited by the Examiner

UNITED STATES PATENTS

| 2,847,312 | 8/1958 | Harper et al. | 99—159 |
|---|---|---|---|
| 2,874,054 | 2/1959 | Kircher et al. | 99—109 |
| 2,930,703 | 3/1960 | Harper | 99—159 |

OTHER REFERENCES

Henrickson et al., Food Technology, Oct. 1956, pages 500–503.

A. LOUIS MONACELL, *Primary Examiner.*

ABRAHAM H. WINKELSTEIN, *Examiner.*

L. M. SHAPIRO, *Assistant Examiner.*